(12) United States Patent
Pashine

(10) Patent No.: US 10,290,300 B2
(45) Date of Patent: May 14, 2019

(54) TEXT RULE MULTI-ACCENT SPEECH RECOGNITION WITH SINGLE ACOUSTIC MODEL AND AUTOMATIC ACCENT DETECTION

(71) Applicant: Harman International Industries, Incorporated, Stamford, CT (US)

(72) Inventor: Rajat Pashine, Indore (IN)

(73) Assignee: Harman International Industries, Incorporated, Stamford, CT (US)

( * ) Notice: Subject to any disclaimer, the term of this patent is extended or adjusted under 35 U.S.C. 154(b) by 167 days.

(21) Appl. No.: 15/327,002

(22) PCT Filed: Jul. 24, 2015

(86) PCT No.: PCT/US2015/042046
§ 371 (c)(1),
(2) Date: Jan. 17, 2017

(87) PCT Pub. No.: WO2016/014970
PCT Pub. Date: Jan. 28, 2016

(65) Prior Publication Data
US 2017/0169814 A1    Jun. 15, 2017

(30) Foreign Application Priority Data

Jul. 24, 2014 (IN) .......................... 3618/CHE/2014

(51) Int. Cl.
*G10L 15/00* (2013.01)
*G10L 15/07* (2013.01)
(Continued)

(52) U.S. Cl.
CPC ............ *G10L 15/07* (2013.01); *G10L 15/005* (2013.01); *G10L 15/02* (2013.01); *G10L 15/06* (2013.01);
(Continued)

(58) Field of Classification Search
None
See application file for complete search history.

(56) References Cited

U.S. PATENT DOCUMENTS 5,911,129 A * 6/1999 Towell ................. G10L 13/033
704/223
6,785,647 B2 * 8/2004 Hutchison .............. G10L 15/16
704/231
(Continued)

OTHER PUBLICATIONS

Hanani, A. et al., "Human and computer recognition of regional accents and ethnic groups from British English Speech," Computer Speech and Language, vol. 27, No. 1, Jan. 2013, 16 pages.
(Continued)

*Primary Examiner* — Marcus T Riley
(74) *Attorney, Agent, or Firm* — McCoy Russell LLP

(57) ABSTRACT

Embodiments are disclosed for recognizing speech in a computing system. An example speech recognition method includes receiving metadata at a generation unit that includes a database of accented substrings, generating, via the generation unit, accent-corrected phonetic data for words included in the metadata, the accent-corrected phonetic data representing different pronunciations of the words included in the metadata based on the accented substrings stored in the database, receiving, at a voice recognition engine, extracted speech data derived from utterances input by a user to the speech recognition system, and receiving, at the voice recognition engine, the accent-corrected phonetic data. The method further includes determining terminal ID(s) identifying recognized utterances in the extracted speech data, generating, accent data identifying accents detected in the recognized utterances, generating recognized speech data based on the one or more terminal IDs and the accent data, and outputting the recognized speech data to the speech-controlled device.

15 Claims, 6 Drawing Sheets

(51) Int. Cl.
*G10L 15/06* (2013.01)
*G10L 15/02* (2006.01)
*G10L 15/22* (2006.01)
*G10L 25/51* (2013.01)

(52) U.S. Cl.
CPC .............. *G10L 15/22* (2013.01); *G10L 25/51* (2013.01); *G10L 2015/025* (2013.01)

(56) References Cited

U.S. PATENT DOCUMENTS

| | | | | |
|---|---|---|---|---|
| 7,668,710 | B2* | 2/2010 | Doyle | G10L 15/01 704/231 |
| 7,860,722 | B1* | 12/2010 | Chow | H04M 3/2281 379/88.02 |
| 8,380,499 | B2* | 2/2013 | Spaulding | G10L 21/10 704/231 |
| 8,583,432 | B1* | 11/2013 | Biadsy | G10L 15/18 704/235 |
| 8,630,860 | B1* | 1/2014 | Zhang | G06F 17/30026 704/275 |
| 2004/0073425 | A1* | 4/2004 | Das | G10L 15/187 704/236 |
| 2005/0171775 | A1* | 8/2005 | Doyle | G10L 15/01 704/250 |
| 2006/0149558 | A1* | 7/2006 | Kahn | G10L 15/063 704/278 |
| 2006/0161434 | A1* | 7/2006 | Faisman | G10L 15/22 704/246 |
| 2008/0147404 | A1* | 6/2008 | Liu | G10L 15/005 704/256.2 |
| 2009/0248419 | A1* | 10/2009 | Spaulding | G10L 15/22 704/275 |
| 2013/0191126 | A1* | 7/2013 | Thambiratnam | G10L 15/187 704/245 |
| 2014/0129218 | A1* | 5/2014 | Liu | G10L 15/32 704/231 |
| 2017/0169814 | A1* | 6/2017 | Pashine | G10L 15/06 |

OTHER PUBLICATIONS

ISA Korean Intellectual Property Office, International Search Report and Written Opinion Issued in Application No. PCT/US2015/042046, dated Nov. 30, 2015, WIPO, 12 pages.

European Patent Office, Extended European Search Report Issued in Application No. 15824083.8, dated Mar. 12, 2018, Germany, 11 pages.

* cited by examiner

TEXT RULE MULTI-ACCENT SPEECH RECOGNITION WITH SINGLE ACOUSTIC MODEL AND AUTOMATIC ACCENT DETECTION

CROSS REFERENCE TO RELATED APPLICATIONS

The present application claims priority to Indian Provisional Patent Application No. 3618/CHE/2014, entitled "TEXT RULE BASED MULTI-ACCENT SPEECH RECOGNITION WITH SINGLE ACOUSTIC MODEL AND AUTOMATIC ACCENT DETECTION," and filed on Jul. 24, 2014, the entire contents of which are hereby incorporated by reference for all purposes.

FIELD

The disclosure relates to speech recognition, and in particular multi-accent speech recognition.

BACKGROUND

Speech recognition for multiple accents of the same language poses a challenge to the embedded devices community. Usually, this problem is solved across different, largely separated, geographies by having different acoustic models for the varied accents. For example, North American, British, Australian, and Indian English have different acoustic models for recognition.

Even with each acoustic model, regional accents may provide additional challenges. For example, although English is usually the second most spoken language after the respective regional mother tongue in India, there are a number of regional English accents across different parts of India. These regional accents pose a challenge to speech recognition that is based on a single acoustic model. Speech recognition may use multi-accent recognition systems employing multiple accent-specific recognizers in parallel. Running multiple accent-specific recognizers with different acoustic models in parallel to improve recognition accuracy can be processor intensive. This intensive resource usage may be particularly challenging for embedded devices with limited processing power. In addition, development and usage of accent specific acoustic models may not be cost effective.

One technique for overcoming the multi-accent issue is to do an analysis of phonetic pairs that are most often confused and form phonetic transfer pairs. These pronunciation transfer pairs are then plugged into the original canonical lexicon, and finally a new dictionary adapted to the accent is constructed. In essence, the approach involves substituting the unused native accent phonetics by the most probable phonetic symbol combinations for the accented pronunciation. This analysis might not be possible with limited or no access to either the acoustic models or the symbols recognized by the recognition engine internally.

SUMMARY

Embodiments are disclosed for an example speech recognition system that includes an accented phonetic and transformed ID generation unit that includes a database of accented substrings, and that receives metadata and ID data associated with the metadata and in a first ID data space. The accented phonetic and transformed ID generation unit provides a plurality of modified words each uniquely associated with an associated one of a plurality of different accents associated with a certain language and processes the plurality of modified words and provides a plurality of accent corrected phonetic data for the plurality of modified words. Each of the accent corrected phonetic data are processed to provide a plurality of transformed IDs in a second ID data space each uniquely associated with an associated one of the plurality of accent corrected phonetic data. A speech feature extractor unit receives and processes user input speech and provides extracted speech data associated with the user input speech. A voice recognition logic unit receives the extracted speech data, the plurality of transformed IDs and the plurality of accent corrected phonetic data and provides a terminal identifier corresponding to a terminal and the accent data for which one of the phonetic transcriptions best matches the extracted speech data associated with the user input speech. An accent detection and inverse ID transform unit receives the terminal identifier and provides a confirmed ID in the first ID data space. An accent result weighting logic unit receives the detected accent data and compares to past values of the detected accent data to provide recognized speech data.

The accented phonetic and transformed ID generation unit may include a grapheme-to-phonetics unit that provides the plurality of accent corrected phonetic data.

The accented phonetic and transformed ID generation unit may include a transformed ID allocator that receives the accent corrected phonetic data and the ID data and provides the plurality of transformed IDs in the second ID data space.

The voice recognition logic unit comprises a context unit that includes a grammar file associated with the certain language. The text entries may comprise for example, phonebook contact names from a contact database, or may be any other metadata associate with a media player, such as for example song title, artist name, genre name, album name, et cetera.

An example speech recognition method performed in a processor receives metadata and ID data in an original ID space, and provides a plurality of modified words each uniquely associated with the metadata and an associated one of a plurality of different accents associated with a certain language and processing the plurality of modified words to provide a plurality of accent corrected phonetic data for the plurality of modified words. The accent corrected phonetic data are processed to provide a plurality of transformed IDs in a transformed ID space each uniquely associated with an associated one of the plurality of accent corrected phonetic data. User input speech data is received and processed to provide extracted speech data associated with the user input speech data. The extracted speech data, the plurality of transformed IDs, and the plurality of accent corrected phonetic data are processed to provide a terminal identifier corresponding to a terminal and to provide accent data for the phonetic transcriptions that matches the extracted speech data associated with the user input speech data. The terminal identifier is processed to provide a confirmed ID in the original ID data space, and the detected accent data is compared to past values of the detected accent data to provide recognized speech data.

Another example speech recognition method performed by a speech recognition system including a speech-controlled device, a processor, and a storage device storing instructions executable by the processor, the method comprising receiving metadata at an accented phonetic and transformed ID generation unit that includes a database of accented substrings, generating, via the accented phonetic and transformed ID generation unit, accent-corrected phonetic data for words included in the metadata, the accent-corrected phonetic data representing different pronunciations of the words included in the metadata based on the accented substrings stored in the database, and receiving, at a voice recognition engine, extracted speech data derived from utterances input by a user to the speech recognition system. The example speech recognition method further includes receiving, at the voice recognition engine, the accent-corrected phonetic data, determining, at the voice recognition engine, one or more terminal IDs identifying recognized utterances in the extracted speech data, generating, at the voice recognition engine, accent data identifying accents detected in the recognized utterances, generating recognized speech data based on the one or more terminal IDs and the accent data, and outputting the recognized speech data to the speech-controlled device.

It is to be understood that the features mentioned above and those to be explained below can be used not only in the respective combinations indicated, but also in other combinations or in isolation. These and other objects, features, and advantages of the invention will become apparent in light of the detailed description of the embodiment thereof, as illustrated in the accompanying drawings.

BRIEF DESCRIPTION OF THE DRAWINGS

The disclosure may be better understood from reading the following description of non-limiting embodiments, with reference to the attached drawings, wherein below.

DETAILED DESCRIPTION

Systems and methods are disclosed herein for a multi-accent speech recognition system that includes an accented word generator. The generator provides a new word that sounds most similar to the input word for a particular accent. This is done for all the accents that are supported by the system. A basis of the accented word generation is string substitution logic based on the combinations of letters in the original word for that particular accent. An ID generator module generates transformed IDs for the substituted words that can be used to identify the ID of the original word, as well as the accent, upon recognition of the accent.

Figure 1:
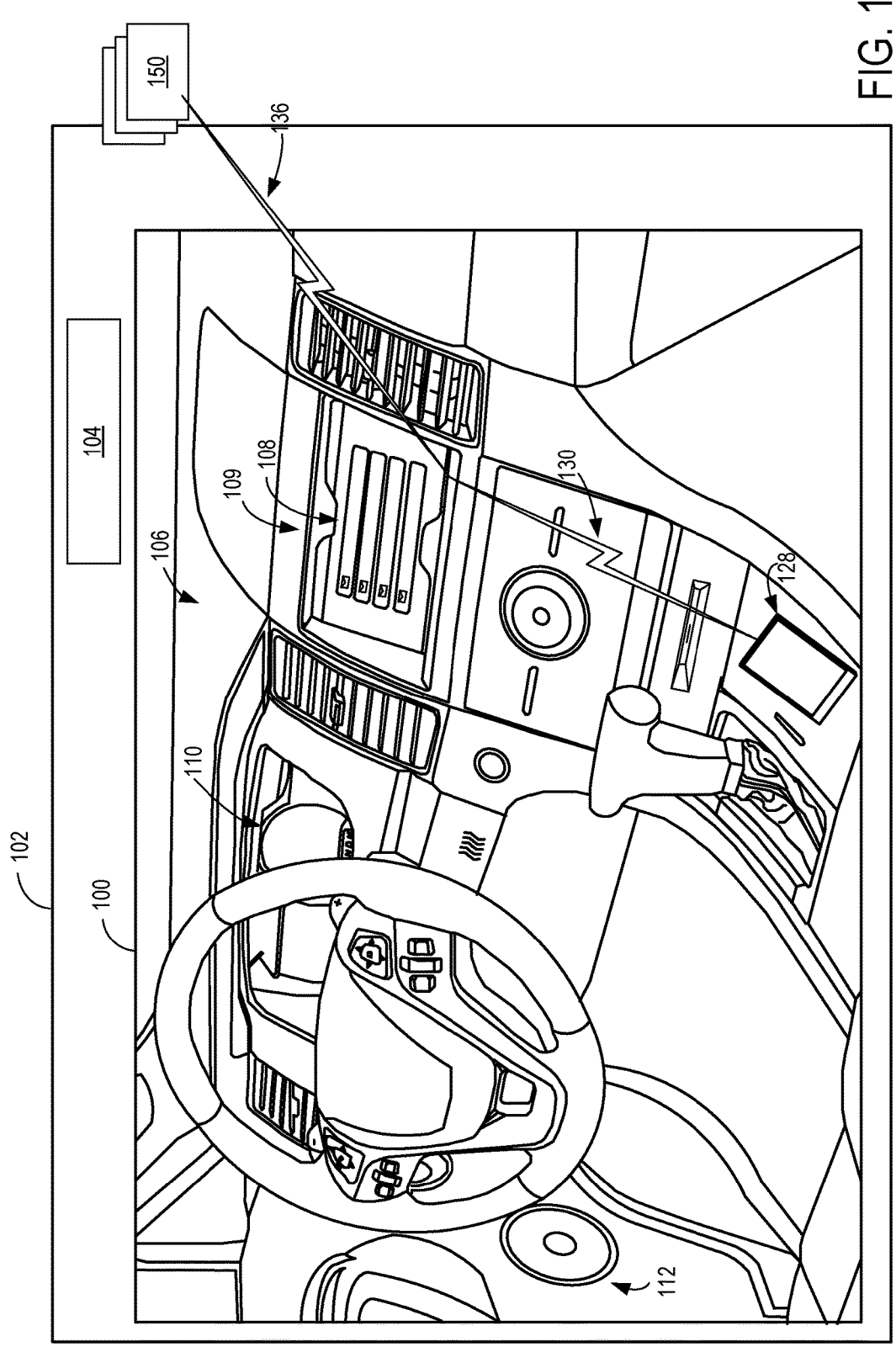
FIG. 1 shows an example partial view of a vehicle cabin in accordance with one or more embodiments of the present disclosure.

FIG. 1 shows an example partial view of one type of environment for a speech recognition system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Vehicle 102 may be a leading vehicle or a trailing vehicle. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, the external devices 150 may include in-vehicle computing devices of another vehicle, as such the vehicle may be a vehicle leading the vehicle 102, or may be a vehicle trailing behind vehicle 102.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
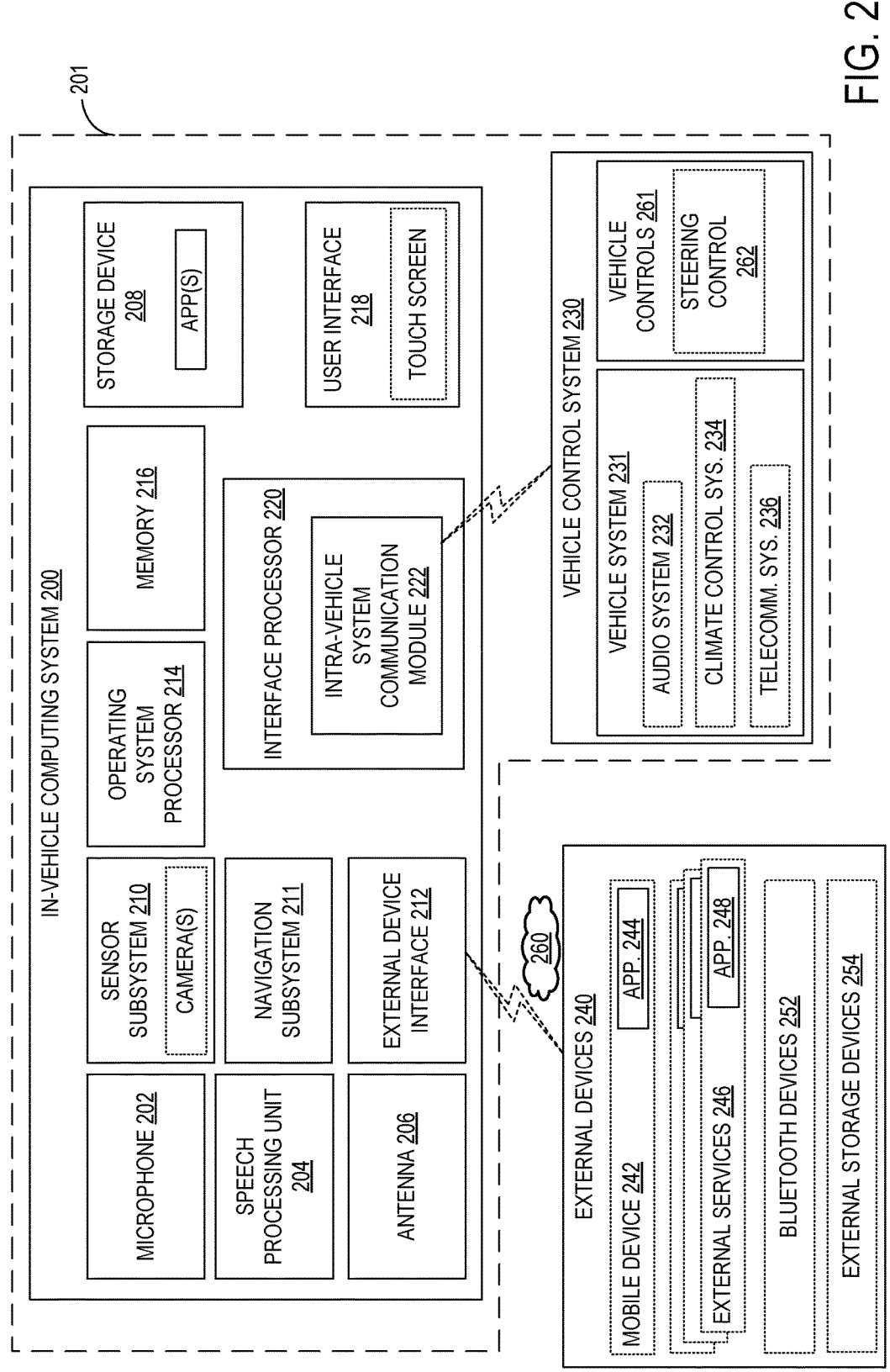
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an intra-vehicle system communication module 222.

Intra-vehicle system communication module 222 may output data to other vehicle systems 231 and vehicle control elements 261, while also receiving data input from other vehicle components and systems 231, 261, e.g. by way of vehicle control system 230. When outputting data, intra-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
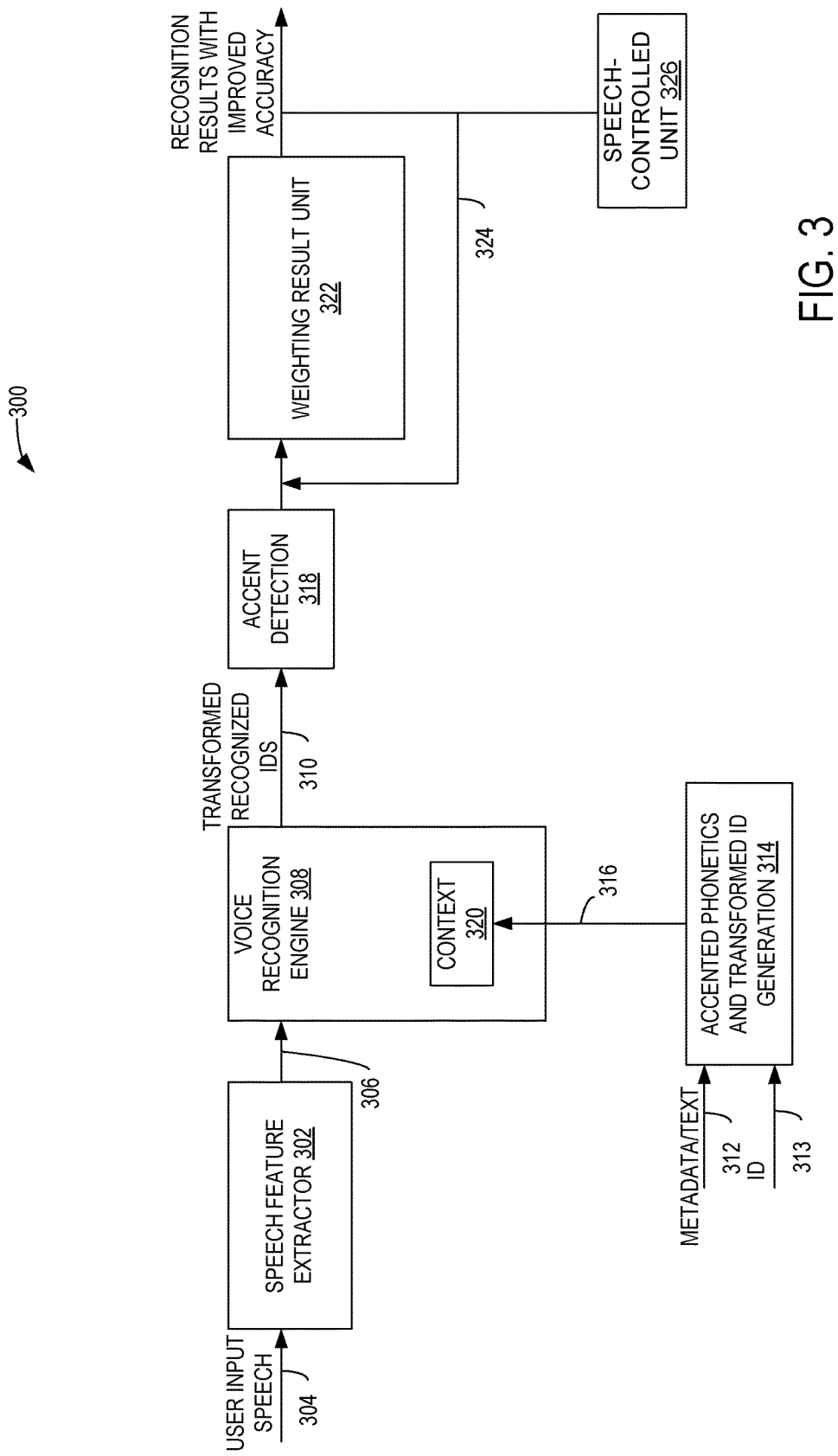
FIG. 3 is a block diagram illustration of an example speech recognition system in accordance with one or more embodiments of the present disclosure.

FIG. 3 is a block diagram illustration of a speech recognition system 300. The system includes a speech feature extractor unit 302 that receives user input speech (e.g., digitized) on a line 304. The user input speech may be detected by a microphone (not shown) and digitized with an analog-to-digital converter (ADC). The feature extractor unit 302 converts the digital speech signals to features that can be used to recognize the speech against the phonetics corresponding to the appropriate words ("terminals") added to a context and return the best matching results. The feature information is provided on a line 306 to a voice recognition engine 308, which then returns an identifier (ID) on a line 310 corresponding to a "terminal" for which one of the phonetic transcriptions best matches the extracted feature associated with the user input speech.

A way speech recognition may work for a fixed vocabulary is through the definition of grammar which contains the list of words to be recognized. Each word or phrase, also called a "terminal," may have one or more ways of pronouncing the word or phrase as a combination of basic phonetic symbols. To know how a terminal is pronounced, one or more phonetic transcriptions may be associated to it. Each terminal has a unique ID associated with it. The grammar may be compiled offline into a binary context file that can be loaded at run time to recognize the user utterance.

The speech recognition system 300 also receives metadata/text entries (e.g., contact/phonebook information from a smart phone or PDA, data from a USB memory stick or audio CD, et cetera) on a line 312. The text entries on the line 312 may include queried substrings, and the accented phonetics and ID generation logic unit may process the received data and provide transformed ID data and phonetic data associated with the various accents on a line 316. That is, the metadata/text entries on the line 312 and ID data on a line 313 associated with the metadata/text entries are input to an accented phonetics and transformed ID generation logic unit 314 that processes the received data and provides transformed ID data and phonetic information associated with the various accents on a line 316. The ID data on the line 313 are in an original ID space, while the transformed ID data on the line 316 are in a transformed data space.

Figure 4:
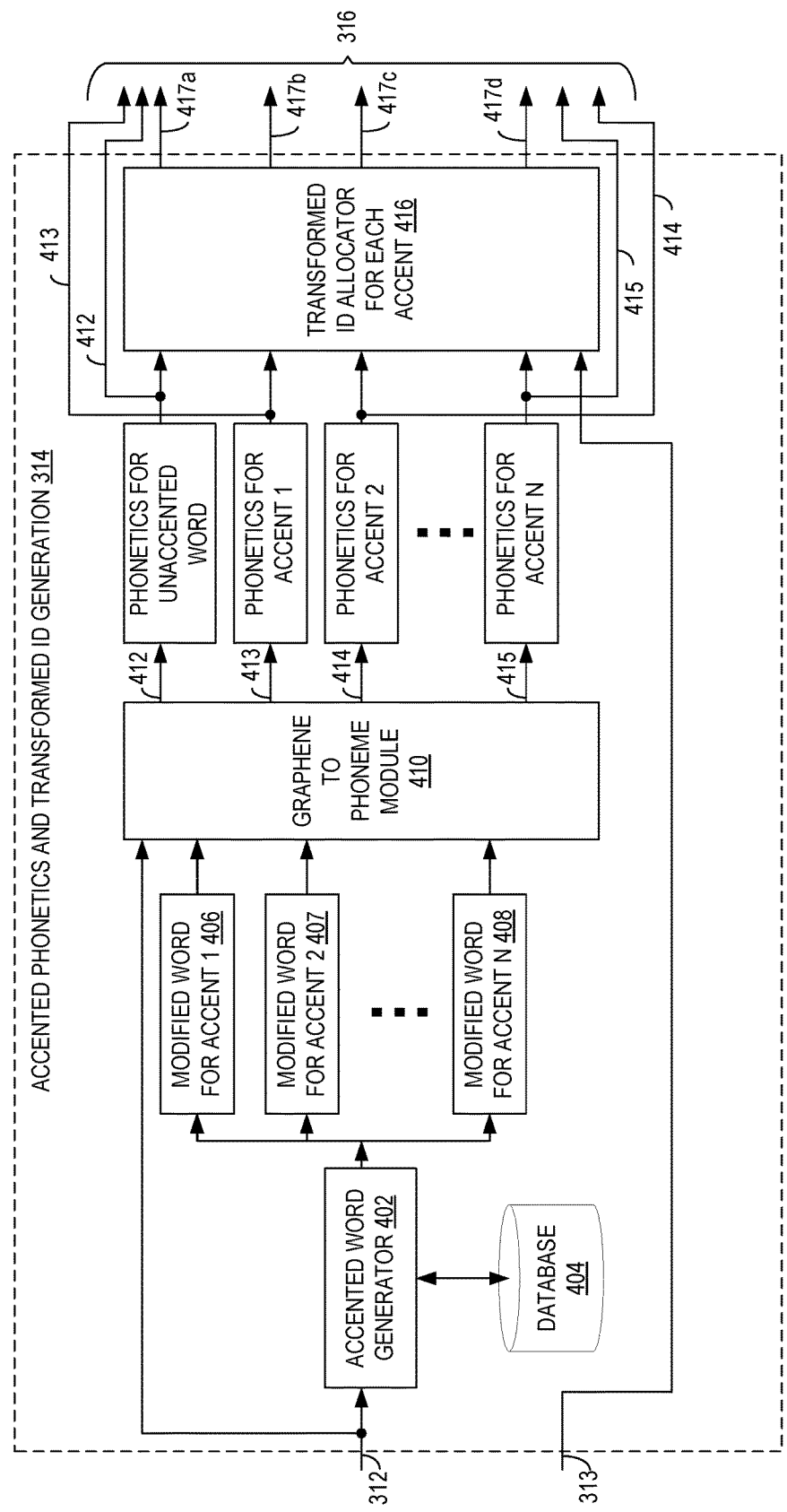
FIG. 4 is a block diagram illustration of an example accented phonetics and ID generation logic unit in accordance with one or more embodiments of the present disclosure.

FIG. 4 is a block diagram illustration of the accented phonetics and a transformed ID generation unit 314. The data on the line 312 is input to an accent word generator 402, which converts a sequence of letters into a sequence of phonetics. The rules are generated by the linguists for that particular language (e.g., the language associated with the accented phonetics and transformed ID generation unit 314 and/or the language that a device including the accented phonetics and transformed ID generation unit 314 is set, automatically and/or by user selection, to recognize). The accented word generator 402 may provide a new word sounding most similar to the word for a particular accent (e.g., based on a comparison of stored words/phonetics to the metadata received on line 312). This is done for all the accents that are supported by the system, for example an N (e.g., positive integer) number of accents may be supported by the accented phonetics and transformed ID generation unit 314. The accent word generator 402 uses rules and data stored in a database 404 to generate a pronunciation for a word based upon the language being used. The language may be automatically identified based upon one or more of historical data and the utterances input by the user, and/or the language may be manually set and identified based upon a selection of the language by the user. For example, the accented word generator 402 may convert the letter string on the line 312, representing for example CAKE, into a phone string such as [K EY K]. The outputs from the accent word generator 402 are provided as modified words on lines 406-408 for each of the N number of accents supported by the accented phonetics and ID generation logic unit 314. Each of the N number of modified words on the lines 406-408 provides an output associated with its particular accent to a grapheme-to-phoneme (G2P) logic unit 410. For example, it is contemplated that for Indian English there may be twelve (12) different accents, thus a modified word for each of those twelve accents (or from a subset of the twelve different accents, such as a subset including [12-x] different accents of the twelve different accents, for example the most popular [12-x] different accents, where x is a positive integer that is less than twelve) may be output from the accented word generator 402.

Referring to FIGS. 3 and 4, the text entries on the line 312 are processed by the accented phonetics and transformed ID generation logic unit 314, which substitutes appropriate accented strings to provide the N number of modified text entries/words on the lines 406-408. Those entries are then used to get the phonetic transcriptions and added to the context for recognition. For example, consider the name "Ananyavrata" stored as an entry. The pronunciation for the name is most close to "Onanyabrota" when pronounced in Bengali. As a general rule, the string "An" can be replaced with "On" and "v" can be replaced with the letter "b." The same name might be pronounced as "Ananyavratha" in Tamil, implying replacement of names ending in "t" with "th." The new strings then can be used to get phonetics transcriptions for each of the accents.

The phonetics generated for all the accents can be added at runtime for the same ID. This means that the voice recognition engine 308 may listen to the accents at the same time in order to improve the recognition accuracy.

Based on acoustic features, the G2P unit 410 provides phonetics data on lines 413-415 for each of the N accents. The G2P unit 410 also provides phonetics data on line 412 associated with the input signal on the line 312 (e.g., unaccented). The basic phonetic sounds may be different in different languages and regions. For example, a vowel may be pronounced differently in African English and North American English. So is the case with different accents in India for different parts of the country. However, there are known ways in which certain word would be pronounced in different regions, or the way stress would be given or pauses would be added. Knowledge of these linguistic features of a language provides the basis to model the phonetic pronunciations. The system may perform such processing and association for names in the selected language (e.g., Indian English) and the plurality of accents associated with the language. For each input string, the phonetics units 412-415 return a unique phonetic transcription. The accented phonetics and transformed ID generation logic unit 314 can be used both offline and on the embedded platform to generate the phonetics, which are output from the G2P unit 410.

The G2P logic unit 410 maps the phonemes of a language based on their acoustic features. For example, the G2P unit generates the most probable phone list for a word not included in the pronunciation dictionary (e.g., out-of-vocabulary words) used to create G2P rules. The G2P unit 410 includes a set of phonemes specific to the language(s) for which the speech recognition system 300 of FIG. 3 is configured.

The phonetics output data from the G2P unit 410 are input to a transformed ID allocator 416 that provides transformed ID data on lines 417a-417d associated with the unaccented phonetics data on the line 412 and the N number of accented phonetics data on the lines 413-415. The transformed IDs are associated with a transformed ID space. The accented phonetics and transformed ID generation unit provides the phonetics data on the lines 412-415 and the transformed ID data on the lines 417a-417d. The signal on the line 412 and the signal on the line 417a provide an output data pair associated with the input signal on the line 312. Similarly, the signal on the line 413 and the signal on the line 417b provide an output data pair associated with the modified words for accent 1 on the line 406, while the signal on the line 414 and the signal on the line 417c provide an output data pair associated with the modified words for accent 2 on the line 407, et cetera.

The transformed ID allocator 416 generates a unique ID for each original word and accented word. For example, if the ID for the original terminal is assigned number 1000 and there are 15 accents that are supported, the system may provide a transformed ID via a transformation accent ID range from 1 to 15. In one embodiment, the transformation may be:

New_ID=(Old_ID*$M$)+Accent_ID, where M=an integer number greater than or equal to N+1, where N is the maximum number of accents supported.

The values of N may be assigned as follows for various Indian accents:
0—Unaccented
1—Bengali accent
2—Gujarati accent
. . .
Etc.

For a word that is assigned an Old_ID value of 1000, and M is equal to 20, then the new ID for the Bengali accented form of the word may be calculated as:

(1000*20)+1=20001.

For the same original word assigned the Old_ID value of 1000, the new ID for the Gujarati accented form of the word may be calculated as:

(1000*20)+2=20002.

When the voice recognition engine 308 passes the transformed recognized IDs to the accent detection unit 318 of FIG. 3, the original terminal IDs and accent IDs may be extracted via the transformation:

Accent_ID=(Recognized_Transformed_ID % $M$), where % represents the modulo (remainder) operator, and Old_ID=Recognized_Transformed_ID-Accent_ID)/$M$.

This ID allocation technique ensures that there is no contention of transformed IDs with the original IDs used by the voice recognition system.

Referring to FIGS. 3 and 4, the voice recognition engine 308 also includes a context unit 320 that receives the data on the lines 412-415 (FIG. 4) indicative of phonetics with corrections for the various accents, and the ID data on the lines 417a-417d (FIG. 4) associated with these phonetics signals. When the speech recognition application is active, the particular context is loaded into the voice recognition engine 308. Once the system receives the user input speech on the line 304, the speech feature extractor unit 302 converts the digitized sound data to features. The voice recognition engine 308 then returns ID data corresponding to a terminal for each of the accented input data pairs input to the voice recognition unit 308 from the accented phonetics and ID generation unit 314.

A grammar file for the context unit 320 may be edited offline by fine-tuning the phonetics returned by the G2P unit 410 (FIG. 4), or for example by using a phonetic generator tool For example, the word "read" can be pronounced as "reed" or "red" based on the context. Therefore, in order to recognize both the pronunciations, the corresponding phonetic transcription for both the pronunciations may be added to the grammar file of the context unit 320 (FIG. 3). Terminals with the appropriate phonetics pronunciations can also be added at run time.

Using offline processing, words can be modeled the way they should be spoken in other languages through text manipulation alone. There is no need to hand tune the phonetic transcriptions, which otherwise can be a cumbersome task. For example, consider the fixed command "find the nearest bank." In certain accents, the word "bank" may be pronounced as "byunk" (broken down as bya-unk). While doing the offline phonetic data preparation for such a language, the word bank can be looked up and replaced with "bya unk," and the corresponding phonetics added as synonym for the purpose of recognition.

A method of online (e.g., on the embedded device) processing of words may be useful for dynamic data loaded by the user. An example of such data is a phonebook entry, which may be obtained for example by connecting a phone (e.g., wirelessly such as via Bluetooth or other wireless connection, and/or via a wireline connection). To be able to recognize the names via speech recognition for dialing, the list of names may be provided on the accented phonetics and ID generation logic 314 (FIG. 4), which returns the phonetic transcriptions for the names. Person names usually have a lot of regional accent which might pose a challenge for recognizing the names. To improve the recognition accuracy, the names may be modified at run time to represent the name in such a way that resembles the accented pronunciation. These modifications may be done at run time and written to a temporary file that may then be used to fetch the phonetic transcriptions from the G2P unit 410 (FIG. 4). The modifications or string substitution may be done by looking up in the database 404 (FIG. 4) and/or on the basis of configuration files (e.g., XML, JSON, or YAML based format) for each of the accents. The modifications or string substitution may achieve a scalable accuracy as the database may be expanded and improved over a period of time.

To increase the accuracy of the recognized IDs from the voice recognition engine 308, the system 300 of FIG. 3 may also include an accent detection unit 318 that receives data indicative of the recognized IDs. The accent detection unit 318 provides data to a weighting result unit 322 that keeps track of the detected accents and provides data indicative of the previously detected accents. Once enough accents have been detected so a confidence is achieved, this historical information indicative of the detected accents, on a line 324, may be used by the weighting result unit 322 to determine the likely accent. The above-described feedback arrangement may increase the accent detection accuracy of the speech recognition system 300 relative to other speech recognition systems that do not utilize such feedback.

The recognition results (e.g., with improved accuracy, from weighting result unit 322) may be provided to one or more speech-controlled units or devices 326. For example, a speech-controlled unit or device 326 may include a display unit that displays text matching the recognized speech results and/or a processor that applies the recognized speech results to a logic process (e.g., to adjust a user interface, perform a search, determine a control command to send to another device for controlling operation of that device, and/or any other suitable process). The speech-controlled units or devices 326 may additionally or alternatively include a device (e.g., a vehicle system, a mobile computing device, a server, etc.) that changes operation based on the recognized speech results and/or a remote service or network interface that relays or transmits the recognized speech results to another remote unit for further processing or control. In general, the one or more speech-controlled units or devices 326 may perform an action based on the recognized speech results from the weighting result unit 322 and/or the accent detection unit 318. The action may include adjusting a display, adjusting operation of a vehicle or vehicle system (e.g., audio system, climate control system, etc.), sending recognized speech results to a remote device, generating text corresponding to the recognized speech results, and/or any other suitable action. The speech-controlled units or devices 326 may include any suitable hardware elements and/or hardware elements including a storage device and a logic device for executing instructions stored in the storage device.

Figure 5:
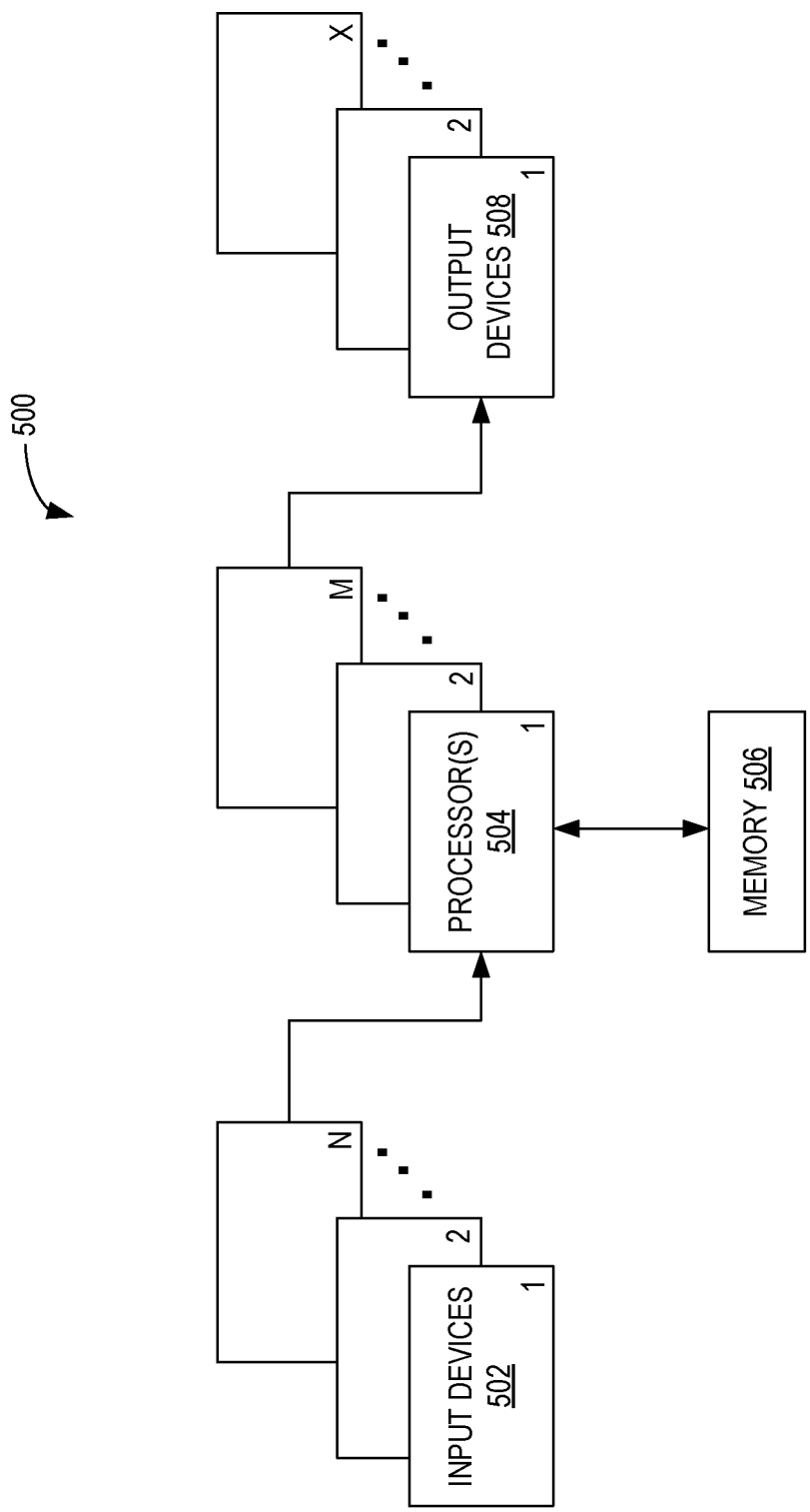
FIG. 5 is a block diagram illustration of an example processing system that includes the example speech recognition system of FIG. 3 in accordance with one or more embodiments of the present disclosure.

FIG. 5 is a block diagram illustration of a processing system 500, for example of an infotainment system, that includes the speech recognition system of FIG. 3. The speech recognition system 300 illustrated in FIG. 3 may be implemented as executable program instructions in one or more processing units 504 (FIG. 5). The processing system 500 may receive input signals from input devices 502 including for example a microphone, a GPS receiver, radio receivers (e.g., AM/FM/satellite/WIFI, Bluetooth, etc.). The processing system 500 may also include a storage device 506 (e.g., a hard drive containing audio and/or video content), and provide output commands and data to a plurality of output devices 508, such as for example a display, loudspeakers, a Bluetooth transceiver, and wireline connections.

Figure 6:
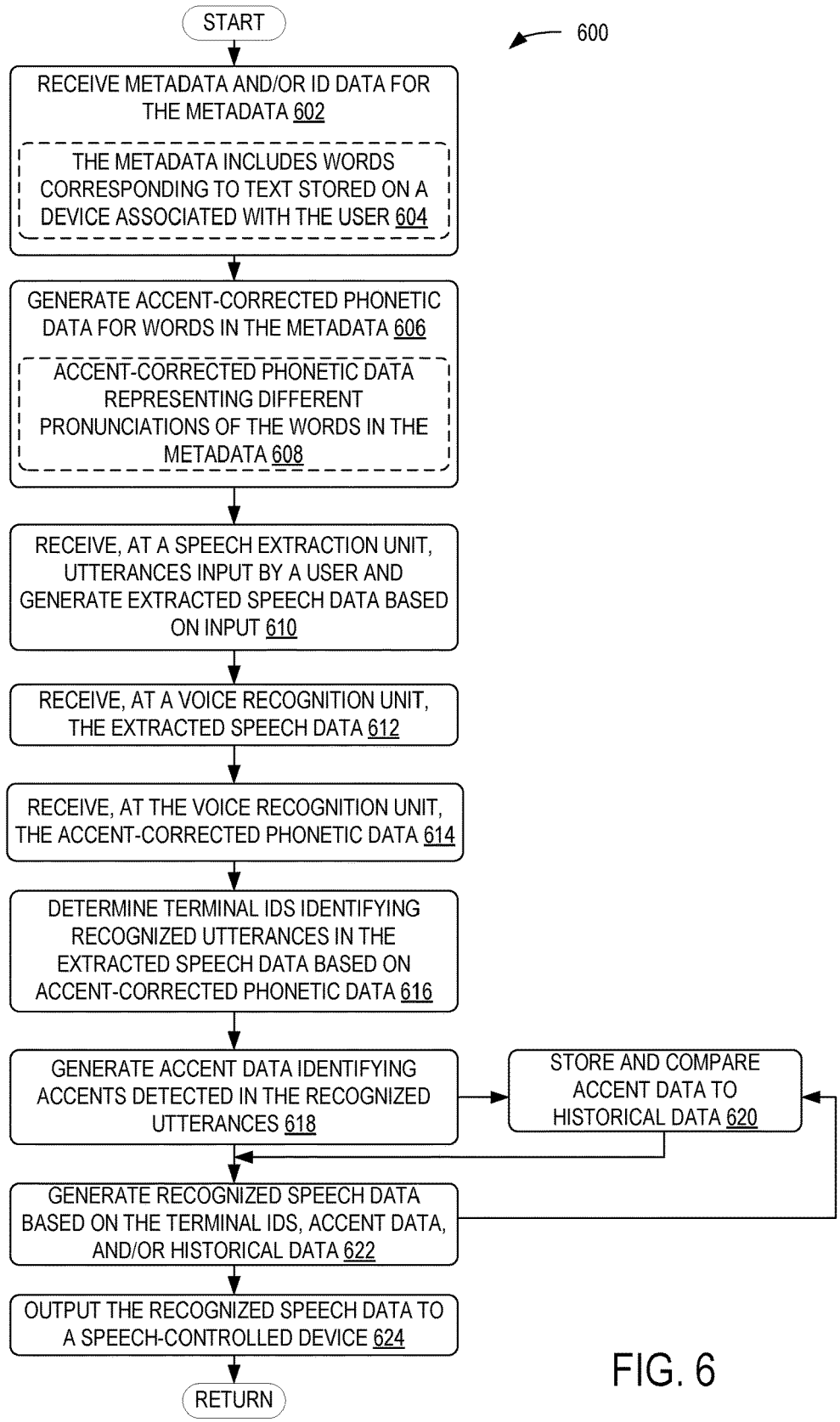
FIG. 6 is a flow chart of a method for performing speech recognition in accordance with one or more embodiments of the present disclosure.

FIG. 6 is a flow chart of a method 600 for performing speech recognition. For example, method 600 may be performed by a speech recognition system, such as speech processing system 500 of FIG. 5 and/or speech recognition system 300 of FIGS. 3 and 4. At 602, the method includes receiving metadata and/or ID data for the metadata at an accented phonetic and transformed ID generation unit that includes a database of accented substrings (e.g., unit 314 of FIG. 3). As indicated at 604, the metadata may include words corresponding to text stored on a device associated with the user. For example, the metadata may include text entries stored on the storage device of the speech recognition system, a mobile device of a user providing input to the speech recognition system, an external service (e.g., a social networking service) hosting a user profile associated with the user providing input to the speech recognition system, and/or any other suitable storage device.

At 606, the method includes generating, via the accented phonetic and transformed ID generation unit, accent-corrected phonetic data for words included in the metadata. As indicated at 608, the accent-corrected phonetic data may represent different pronunciations of the words included in the metadata based on the accented substrings stored in the database. The accented phonetic and transformed ID generation unit may further generate transformed IDs for the accent-corrected phonetic data. For example, the accent-corrected phonetic data may include accented words, each accented word corresponding to an associated original word included in the metadata, each of the transformed IDs corresponding to a different accent word and generated based on an accent for that accented word and the ID data for the original word associated with that accented word.

At 610, the method includes receiving, at a speech extraction unit, utterances input by a user and generate extracted speech data based on the input. At 612, the method includes receiving, at a voice recognition engine (e.g., voice recognition engine 308 of FIG. 3). At 614, the method includes receiving, at the voice recognition engine, the accent-corrected phonetic data.

At 616, the method includes determining, at the voice recognition engine, one or more terminal IDs identifying recognized utterances in the extracted speech data. At 618, the method includes generating, at the voice recognition engine, accent data identifying accents detected in the recognized utterances. At 620, the method includes storing and comparing the generated accent data to historical data (e.g., prior-generated accent data and/or recognized speech data). The generated accent data and historical data may be received at a weighting result unit (e.g., unit 322 of FIG. 3, the historical data may include recognized speech results that are received and stored at the weighting result unit upon generating those recognized speech results). The weighting result unit may compare the current and prior data (e.g., the currently-determined accent data and the prior-determined historical data) to determine whether the accent data matches recently-determined accents of prior recognized speech results. At 622, the method includes generating recognized speech data based on the terminal IDs, the accent data, and/or the historical data. For example, the recognized speech data and the one or more terminal IDs may be matched to words of the metadata and the ID data for the words of the metadata. At 624, the method includes outputting the recognized speech data to a speech-controlled device (e.g., the speech-controlled device 326 of FIG. 3).

The systems and methods disclosed herein addresses the problem of supporting multiple accents (e.g., of Indian English) through a single acoustic model. Phonetics are generated offline or online for the particular accent by modifying the words used to get the phonetics for the G2P unit.

The above systems and methods also provide for an example speech recognition system including an accented phonetic and transformed ID generation unit that includes a database of accented substrings, and that receives metadata and ID data associated with the metadata and in a first ID data space, and provides a plurality of modified words each uniquely associated with an associated one of a plurality of different accents associated with a certain language and processes the plurality of modified words and provides a plurality of accent corrected phonetic data for the plurality of modified words, wherein each of the accent corrected phonetic data are processed to provide a plurality of transformed IDs in a second ID data space each uniquely associated with an associated one of the plurality of accent corrected phonetic data, a speech feature extractor unit that receives and processes user input speech and provides extracted speech data associated with the user input speech, a voice recognition logic unit that receives the extracted speech data, the plurality of transformed IDs and the plurality of accent corrected phonetic data and provides a terminal identifier corresponding to a terminal and accent data for which one of the phonetic transcriptions best matches the extracted speech data associated with the user input speech, an accent detection and inverse ID transform unit that receives the terminal identifier and provides a confirmed ID in the first ID data space, and accent result weighting logic unit that receives the detected accent data and compares to past values of the detected accent data to provide recognized speech data. In a first example, the speech recognition system may optionally include the speech recognition system wherein the accented phonetic and transformed ID generation unit comprises a graphemeto-phonetics unit that provides the plurality of accent corrected phonetic data. A second example of the speech recognition system optionally includes the first example and further includes the speech recognition system wherein the accented phonetic and transformed ID generation unit comprises a transformed ID allocator that receives the accent corrected phonetic data and the ID data and provides the plurality of transformed IDs in the second ID data space. A third example of the speech recognition system optionally includes one or more of the first example and the second example, and further includes the speech recognition system wherein the voice recognition logic unit comprises a context unit that includes a grammar file associated with the certain language.

The above systems and methods also provide for an example speech recognition method that-accesses a database of accented substrings, including receiving metadata and ID data associated with the metadata and in an original ID space, and providing a plurality of modified words each uniquely associated with an associated one of a plurality of different accents associated with a certain language and processing the plurality of modified words to provide a plurality of accent corrected phonetic data for the plurality of modified words, wherein each of the accent corrected phonetic data are processed to provide a plurality of transformed IDs in a transformed ID space each uniquely associated with an associated one of the plurality of accent corrected phonetic data, receiving user input speech and processing the received input speech in a speech feature extractor unit to provide extracted speech data associated with the user input speech, processing the extracted speech data, the plurality of transformed IDs and the plurality of accent corrected phonetic data and providing a terminal identifier corresponding to a terminal and the accent data for which one of the phonetic transcriptions best matches the extracted speech data associated with the user input speech, processing the terminal identifier to provide a confirmed ID in the original ID data space, and comparing the detected accent data to past values of the detected accent data to provide recognized speech data. A first example of the speech recognition method includes the method wherein the step of providing the plurality of accent corrected phonetic data comprising grapheme-ta-phonetics processing of the plurality of modified words to provide the plurality of accent corrected phonetic data.

The above systems and methods also provide for a speech recognition method that is performed in a processor that accesses a database of accented substrings, including receiving metadata and ID data in an original ID space that is associated with the metadata, providing a plurality of modified words each uniquely associated with the metadata and an associated one of a plurality of different accents associated with a certain language and processing the plurality of modified words to provide a plurality of accent corrected phonetic data for the plurality of modified words, processing the accent corrected phonetic data to provide a plurality of transformed IDs in a transformed ID space each uniquely associated with an associated one of the plurality of accent corrected phonetic data, receiving user input speech data and processing the received input speech data to provide extracted speech data associated with the user input speech data, processing the extracted speech data, the plurality of transformed IDs and the plurality of accent corrected phonetic data and providing a terminal identifier corresponding to a terminal and to provide accent data for the phonetic transcriptions that best matches the extracted speech data associated with the user input speech data, processing the terminal identifier to provide a transformed ID in the original ID data space, and comparing the detected accent data to past values of the detected accent data to provide recognized speech data.

The above systems and methods also provide for a speech recognition system including a speech-controlled device, a processor, and a storage device storing instructions executable by the processor to receive metadata at an accented phonetic and transformed ID generation unit that includes a database of accented sub strings, generate, via the accented phonetic and transformed ID generation unit, accent-corrected phonetic data for words included in the metadata, the accent-corrected phonetic data representing different pronunciations of the words included in the metadata based on the accented substrings stored in the database, receive, at a voice recognition engine, extracted speech data derived from utterances input by a user to the speech recognition system, receive, at the voice recognition engine, the accent-corrected phonetic data, determine, at the voice recognition engine, one or more terminal IDs identifying recognized utterances in the extracted speech data, generate, at the voice recognition engine, accent data identifying accents detected in the recognized utterances, generate recognized speech data based on the one or more terminal IDs and the accent data, and output the recognized speech data to the speech-controlled device. A first example of the speech recognition system includes the speech recognition system wherein the instructions are further executable to receive, at a weighting result unit, the accent data and historical data including prior-generated accent data, and to compare the accent data to the historical data, the recognized speech data being further based on the comparison of the accent data to the historical data. A second example of the speech recognition system optionally includes the first example and further includes the speech recognition system wherein the metadata corresponds to text entries stored on one or more of the storage device of the speech recognition system, a mobile device of a user providing input to the speech recognition system, and an external service hosting a user profile associated with the user providing input to the speech recognition system. A third example of the speech recognition system optionally includes any one or more of the first example and the second example and further includes the speech recognition system wherein the instructions are further executable to receive, at the accented phonetic and transformed ID generation unit, ID data corresponding to the words included the metadata and generate, at the accented phonetic and transformed ID generation unit, transformed IDs for the accent-corrected phonetic data. A fourth example of the speech recognition system optionally includes any one or more of the first example through the third example, and further includes the speech recognition system wherein the accent-corrected phonetic data includes accented words, each accented word corresponding to an associated original word included in the metadata, each of the transformed IDs corresponding to a different accent word and generated based on an accent for that accented word and the ID data for the original word associated with that accented word. A fifth example of the speech recognition system optionally includes any one or more of the first example through the fourth example, and further includes the speech recognition system wherein the recognized speech data and the one or more terminal IDs are matched to words of the metadata and the ID data for the words of the metadata. A sixth example of the speech recognition system optionally includes any one or more of the first example through the fifth example, and further includes the speech recognition system wherein the voice recognition logic unit includes a context unit that includes a grammar file associated with a language identified for a user. A seventh example of the speech recognition system optionally includes any one or more of the first example through the sixth example, and further includes the speech recognition system wherein the language is automatically identified based upon one or more of historical data and the utterances input by the user. An eighth example of the speech recognition system optionally includes any one or more of the first example through the seventh example, and further includes the speech recognition system wherein the language is identified based upon a selection of the language by the user. A ninth example of the speech recognition system optionally includes any one or more of the first example through the eighth example, and further includes the speech recognition system wherein the speech recognition system includes an in-vehicle computing system of a vehicle, and wherein the speech-controlled device includes one or more of a display of the in-vehicle computing system and a vehicle system in the vehicle.

The above systems and methods also provide for a speech recognition method performed by a speech recognition system including a speech-controlled device, a processor, and a storage device storing instructions executable by the processor, the method comprising receiving metadata at an accented phonetic and transformed ID generation unit that includes a database of accented substrings, generating, via the accented phonetic and transformed ID generation unit, accent-corrected phonetic data for words included in the metadata, the accent-corrected phonetic data representing different pronunciations of the words included in the metadata based on the accented substrings stored in the database, receiving, at a voice recognition engine, extracted speech data derived from utterances input by a user to the speech recognition system, receiving, at the voice recognition engine, the accent-corrected phonetic data, determining, at the voice recognition engine, one or more terminal IDs identifying recognized utterances in the extracted speech data, generating, at the voice recognition engine, accent data identifying accents detected in the recognized utterances, generating recognized speech data based on the one or more terminal IDs and the accent data, and outputting the recognized speech data to the speech-controlled device. A first example of the method further includes receiving, at a weighting result unit, the accent data and historical data including prior-generated accent data, and to compare the accent data to the historical data, the recognized speech data being further based on the comparison of the accent data to the historical data. A second example of the method optionally includes the first example and further includes the method wherein comparing the accent data to the historical data comprises determining whether an accent identified by the accent data matches accents identified in recently-recognized speech data. A third example of the method optionally includes any one or more of the first example and the second example, and further includes the method wherein the metadata corresponds to text entries stored on one or more of the storage device of the speech recognition system, a mobile device of a user providing input to the speech recognition system, and an external service hosting a user profile associated with the user providing input to the speech recognition system. A fourth example of the method optionally includes any one or more of the first example through the third example, and further includes receiving, at the accented phonetic and transformed ID generation unit, ID data corresponding to the words included the metadata and generate, at the accented phonetic and transformed ID generation unit, transformed IDs for the accent-corrected phonetic data. A fifth example of the method optionally includes any one or more of the first example through the fourth example, and further includes the method wherein the accent-corrected phonetic data includes accented words, each accented word corresponding to an associated original word included in the metadata, each of the transformed IDs corresponding to a different accent word and generated based on an accent for that accented word and the ID data for the original word associated with that accented word. A sixth example of the method optionally includes any one or more of the first example through the fifth example, and further includes the method wherein the recognized speech data and the one or more terminal IDs are matched to words of the metadata and the ID data for the words of the metadata. A seventh example of the method optionally includes any one or more of the first example through the sixth example, and further includes the method wherein the voice recognition logic unit includes a context unit that includes a grammar file associated with a language identified for a user. An eighth example of the method optionally includes any one or more of the first example through the seventh example, and further includes the method wherein the language is automatically identified based upon one or more of historical data and the utterances input by the user. A ninth example of the method optionally includes any one or more of the first example through the eighth example, and further includes the method wherein the language is identified based upon a selection of the language by the user. A tenth example of the method optionally includes any one or more of the first example through the ninth example, and further includes the method wherein the speech recognition system includes an in-vehicle computing system of a vehicle, and wherein speech-controlled device includes one or more of a display of the in-vehicle computing system and a vehicle system in the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or speech recognition system 300 described with reference to FIGS. 1 and 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third,"

etc. are used merely as labels, and are not intended to impose numerical requirements or a particular positional order on their objects. The following claims particularly point out subject matter from the above disclosure that is regarded as novel and non-obvious.

The invention claimed is:

1. A speech recognition system comprising:
an accented phonetic and transformed ID generation unit that includes a database of accented substrings, and that receives metadata and IDs associated with words of the metadata, the IDs being in a first ID data space, and provides a plurality of modified words each uniquely associated with an associated one of a plurality of different accents associated with a certain language, the modified words resulting from replacing strings of corresponding words of the metadata for the different accents, and processes the plurality of modified words and provides a plurality of accent corrected phonetic data for the plurality of modified words, wherein each of the accent are processed to provide a plurality of transformed IDs in a second ID data space each uniquely associated with an associated one of the plurality of accent corrected phonetic data;
a speech feature extractor unit that receives and processes user input digital speech signals and provides extracted speech data associated with the user input digital speech signals;
a voice recognition logic unit that receives the extracted speech data, the plurality of transformed IDs, and the plurality of accent corrected phonetic data and provides a word identifier corresponding to a word and accent data for which one of one or more phonetic transcriptions best matches the extracted speech data associated with the user input digital speech signals, the accent data identifying accents detected in recognized utterances;
an accent detection and inverse ID transform unit that receives the word identifier and provides a confirmed ID in the first ID data space; and
an accent result weighting logic unit that receives the detected accent data and historical data including prior-generated accent data and compares the accent data to the historical data, recognized speech data being generated and based on the comparison of the accent data to the historical data, wherein comparing the accent data to the historical data comprises determining whether an accent identified by the accent data matches accents identified in recently-recognized speech data.

2. The speech recognition system of claim 1, wherein the accented phonetic and transformed ID generation unit comprises a grapheme-to-phonetics unit that provides the plurality of accent corrected phonetic data.

3. The speech recognition system of claim 1, wherein the accented phonetic and transformed ID generation unit comprises a transformed ID allocator that receives the plurality of accent corrected phonetic data and the IDs and provides the plurality of transformed IDs in the second ID data space.

4. The speech recognition system of claim 3, wherein the voice recognition logic unit comprises a context unit that includes a grammar file associated with the certain language.

5. A speech recognition method performed by a speech recognition system including a speech-controlled device, a processor, and a storage device storing instructions executable by the processor, the method comprising:
receiving metadata at an accented phonetic and transformed ID generation unit that includes a database of accented substrings;
generating, via the accented phonetic and transformed ID generation unit, accent-corrected phonetic data for words included in the metadata, the accent-corrected phonetic data representing different pronunciations of the words included in the metadata based on the accented substrings stored in the database;
receiving, at a voice recognition engine, extracted speech data derived from utterances input by a user to the speech recognition system;
receiving, at the voice recognition engine, the accent-corrected phonetic data;
determining, at the voice recognition engine, one or more word IDs identifying recognized utterances in the extracted speech data;
generating, at the voice recognition engine, accent data identifying accents detected in the recognized utterances;
generating recognized speech data based on the one or more word IDs and the accent data;
outputting the recognized speech data to the speech-controlled device; and
receiving, at a weighting result unit, the accent data and historical data including prior-generated accent data, and comparing the accent data to the historical data, the recognized speech data being further based on the comparison of the accent data to the historical data, wherein comparing the accent data to the historical data comprises determining whether an accent identified by the accent data matches accents identified in recently-recognized speech data.

6. The method of claim 5, wherein the metadata corresponds to text entries stored on one or more of the storage device of the speech recognition system, a mobile device of a user providing input to the speech recognition system, and an external service hosting a user profile associated with the user providing input to the speech recognition system.

7. The method of claim 5, further comprising receiving, at the accented phonetic and transformed ID generation unit, ID data corresponding to the words included the metadata and generating, at the accented phonetic and transformed ID generation unit, transformed IDs for the accent-corrected phonetic data.

8. The method of claim 7, wherein the accent-corrected phonetic data includes accented words, each accented word corresponding to an associated original word included in the metadata, each of the transformed IDs corresponding to a different accent word and generated based on an accent for that accented word and the ID data for the associated original word associated with that accented word.

9. The method of claim 8, wherein the recognized speech data and the one or more word IDs are matched to words of the metadata and the ID data for the words of the metadata.

10. The method of claim 5, wherein the voice recognition engine includes a context unit that includes a grammar file associated with a language identified for the user.

11. The method of claim 10, wherein the language is automatically identified based upon one or more of the historical data and the utterances input by the user.

12. The method of claim 11, wherein the language is identified based upon a selection of the language by the user.

13. The method of claim 5, wherein the speech recognition system includes an in-vehicle computing system of a vehicle, and wherein the speech-controlled device includes one or more of a display of the in-vehicle computing system and a vehicle system in the vehicle.

14. A speech recognition system comprising:

a speech-controlled device;

a processor; and a storage device storing instructions executable by the processor, the instructions executable to:

receive metadata and ID data in an original ID space that is associated with the metadata;

provide a plurality of modified words each uniquely associated with the metadata and an associated one of a plurality of different accents associated with a certain language and process the plurality of modified words to provide a plurality of accent corrected phonetic data for the plurality of modified words;

process the plurality of accent corrected phonetic data to provide a plurality of transformed IDs in a transformed ID space each uniquely associated with an associated one of the plurality of accent corrected phonetic data;

receive user input speech data and process the received user input speech data to provide extracted speech data associated with the user input speech data;

process the extracted speech data, the plurality of transformed IDs, and the plurality of accent corrected phonetic data and provide a terminal identifier corresponding to a terminal and to provide accent data for one or more phonetic transcriptions that best matches the extracted speech data associated with the user input speech data;

process the terminal identifier to provide a transformed ID in the original ID data space; and compare detected accent data to past values of the detected accent data to provide recognized speech data, wherein processing the plurality of accent corrected phonetic data to provide the plurality of transformed IDs in the transformed ID space includes providing the plurality of accent corrected phonetic data and the ID data to a transformed ID allocator and receiving, from the transformed ID allocator, the plurality of transformed IDs in the transformed ID space.

15. The speech recognition system of claim 14, wherein processing the plurality of modified words to provide the plurality of accent corrected phonetic data includes grapheme-to-phonetics processing the plurality of modified words to provide the plurality of accent corrected phonetic data.

* * * * *

UNITED STATES PATENT AND TRADEMARK OFFICE
CERTIFICATE OF CORRECTION

PATENT NO. : 10,290,300 B2
APPLICATION NO. : 15/327002
DATED : May 14, 2019
INVENTOR(S) : Rajat Pashine Page 1 of 1

It is certified that error appears in the above-identified patent and that said Letters Patent is hereby corrected as shown below:

In the Claims

In Claim 1, Column 21, Lines 19-20, correct "wherein each of the accent are processed" to read "wherein each of the accent corrected phonetic data are processed".

Signed and Sealed this
Second Day of July, 2019

Andrei Iancu
*Director of the United States Patent and Trademark Office*